United States Patent [19]
Fadavi-Ardekani et al.

[11] Patent Number: 6,067,317
[45] Date of Patent: *May 23, 2000

[54] COMPUTER BUS RESOURCE PORT

[75] Inventors: Jalil Fadavi-Ardekani, Orefield; Kenneth D. Fitch, Allentown, both of Pa.; Walter G. Soto, Irvine, Calif.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/649,095

[22] Filed: May 17, 1996

[51] Int. Cl.⁷ .................................................. H04B 1/38
[52] U.S. Cl. .................. 375/222; 375/19; 395/200.7; 395/200.8
[58] Field of Search .................... 375/219, 222, 375/264, 286, 220; 395/200.07, 200.08, 200.12, 200.16, 856, 858, 882, 883, 884, 886

[56] References Cited

U.S. PATENT DOCUMENTS

| | | |
|---|---|---|
| 5,602,902 | 2/1997 | Satterlund et al. ..................... 375/222 |
| 5,633,890 | 5/1997 | Ahmed ..................................... 375/219 |
| 5,636,244 | 6/1997 | Goodson et al. ........................ 375/222 |
| 5,671,251 | 9/1997 | Blackwell et al. ....................... 375/222 |
| 5,680,553 | 10/1997 | Shamar et al. ........................... 395/250 |
| 5,680,596 | 10/1997 | Iizuka et al. ........................ 395/200.07 |
| 5,684,825 | 11/1997 | Ko ............................................ 375/222 |
| 5,819,112 | 10/1998 | Kusters .................................... 395/856 |

OTHER PUBLICATIONS

Upgrading and Repairing PCs, Second Edition by Scott Mueller, 1992.

Primary Examiner—Congvan Tran

[57] ABSTRACT

A resource port that provides a host processor the facility to request, share and access the resources of data communication equipment (DCE), including the memory and I/O registers of the DCE controller. In one embodiment the resource port has a controller request line to provide the host with a facility to request access to the controller resources, and an interface circuit to provide the facility to index all the resources of the DCE. The interface circuit compensates for any disparity between the widths of the controller address bus and the host processor address bus, and between the widths of the host processor data bus and the controller data bus.

15 Claims, 3 Drawing Sheets

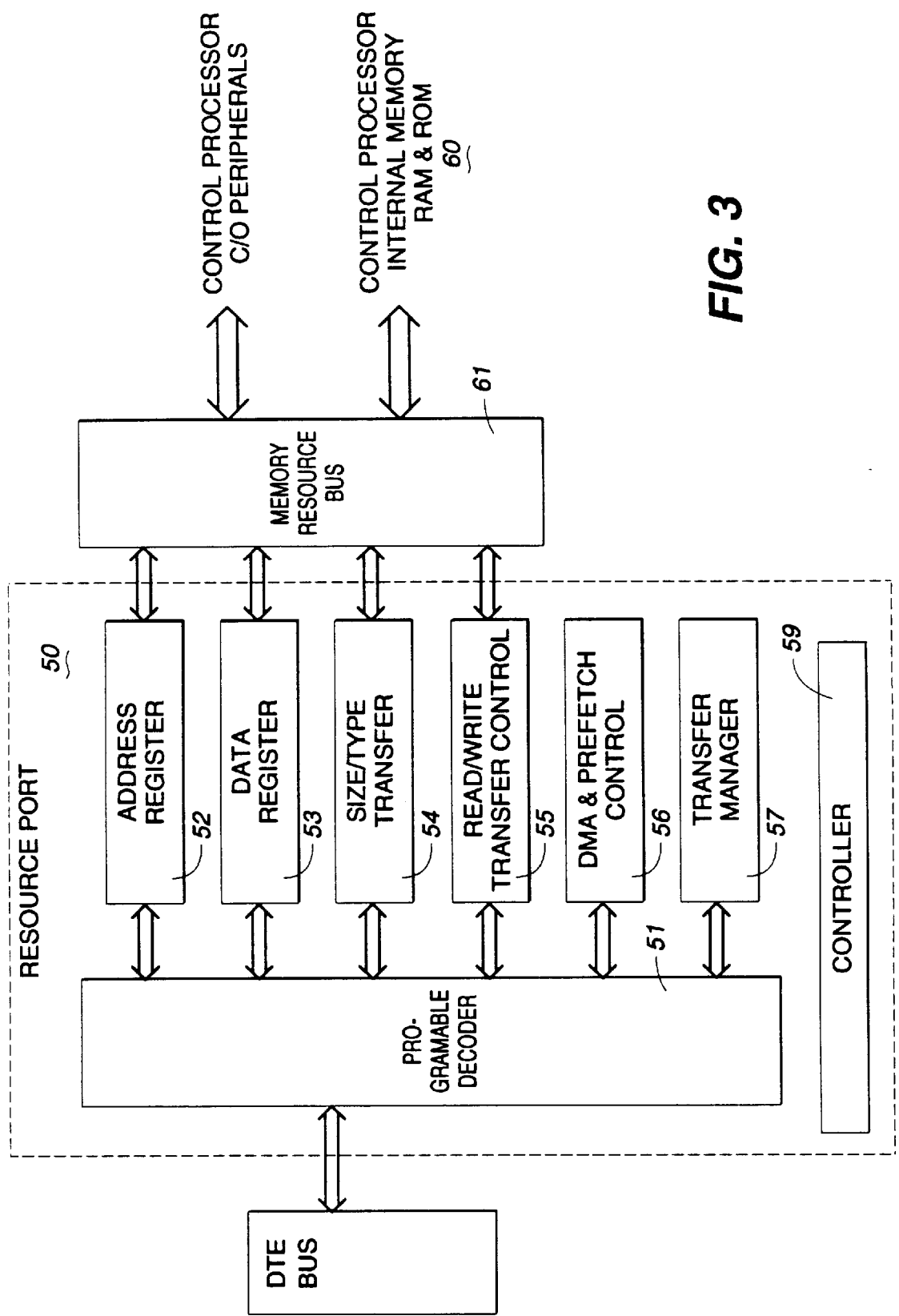

COMPUTER BUS RESOURCE PORT

FIELD OF THE INVENTION

The present invention relates to data communications equipment, and more particularly to a communication port for a data communication equipment controller.

BACKGROUND OF THE INVENTION

Data terminal equipment (DTE) such as computers and facsimile machines routinely send and receive information and control signals through communications networks (i.e. the telephone network). In order to effectively use the network facilities, however, the DTE must have a means of translating digital data into a form suitable for transmission over the network. Similarly, DTE devices at the receiving end must have a means for translating that signal back into digital form, check for errors, and make use of the information.

The most common type of data communications equipment used for such data transmission is a modem. A modem is capable of modulating and demodulating digital data over a communication medium of a communications network. For example, in communicating over a telephone network, one modem translates the digital data generated by the originating DTE into digital pulses and sends the pulses over the telephone network to a second modem at the receiving end. The receiving modem then translates the digital pulses back into the digital data and sends it to the receiving DTE.

A typical present day modem architecture is shown in FIG. 1. As shown, such present day modems have a controller and a digital signal processor (DSP) which are electrically connected to each other through an interface circuit. The controller provides supervisory functions such as inserting control commands in the data stream for error and flow control which is normally referred to as "link layer", and providing data compression. The DSP, codec and the interface circuit together form a data pump which is responsible for carrying out the digital communication portion of various CCITT standards such as the V.34 standard (which establishes 28.8Kb/sec two-way communication). That is, the data pump performs functions such as V.34 startup, retrains, modulation, demodulation, channel equalization, echo cancellation, and timing recovery. Basically, the controller supervises the data stream, and the data pump prepares the stream for communication over a transmission medium (e.g. a phone line).

During operation, the host communicates with the modem controller for several purposes, including: setting the modem features as desired by the DCE host user; and setting the parameters of the modem card. More specifically, the host sets parameters such as attention commands during modem connection, and modem card settings to conform the modem to the desired communication standard including the Personal Computer Memory Card International Association (PCMCIA) standard.

In communicating with the host (DTE), however, the controller must interrupt the host (DTE), and the controller must orchestrate the exchange of the data from the host to the appropriate peripheral. Moreover, the host must wait for the controller to check the success of this data transfer, and report back to the host processor. As a result, in addition to significantly reducing the modem efficiency, the transfer of data from the host to the controller may appear slow to the host user. In addition, this communication requires additional modem hardware, including hardware mailboxes and command registers, thus increasing modem cost.

For example, in many present day modem designs a host processor can transfer data to the modem resources through the modem controller. That is, the controller initiates both record and playback PC DMA transfers, and coordinates data transfers for the DTE (host processor) to the data pump through MIMIC FIFO's that prevent data overruns. As a result, when accessing the resources of the modem the host processor ties-up the operation of the modem controller, and thus significantly adds to modem timing overhead. Moreover, when accessing these resources the host processor has no way of directly accessing the status of these modem peripherals, controller functions, or DSP functions without going through the controller.

This is not desirable for many present and/or future modem applications, wherein the host requires multi-channel communications. For example, there is an increasing need and desire for digital simultaneous voice and data (DSVD) communications through the same DCE or modem. In such DSVD communications, the modem must simultaneously transmit both voice and data communications on the same line. In order to achieve this, the DSP needs to perform a great number of mathematical operations to disguise the speech or voice on the modem waveform when transmitting, and extract the voice when receiving.

More specifically, DSVD communications requires the modem DSP to look at more data points in the bit stream, and requires the modem controller to handle both the separation and combination of two simultaneous bit streams. The increased demand (on the modem controller and DSP) increases the need for a more efficient modem, and thus a more efficient interface between the host (DTE) and the modem (DCE) resources than that provided by present day modems.

Some commercial modems presently make use of the microprocessor of a personal computer and the operating system software (e.g. Windows 3.1) to perform the function of the modem controller. As host processors and their Operating Systems (e.g. Windows '95) become more powerful, the host processor may also be utilized to perform some or all of the functions that are currently done by the modem data pump. To achieve this, however, the host (DTE) processor will need to have direct access to modem peripherals including the I/O peripherals and the modem controller's memory space (i.e. ROM and RAM). As a result, whether the application requires the mixed implementation of functions between the host processor and the modem controller, or the host processor's total control over the modem functions, the host processor must have a means of directly accessing the I/O and memory space of the modem (DCE).

SUMMARY OF THE INVENTION

Accordingly, the present invention is directed to a resource port that provides a host processor the facility to request, share and directly access DCE resources operating with and without a DCE controller. To attain this, the present invention provides an interface, between the host DTE and the DCE, having hardware that enables the host (DTE) processor to directly access and index the available resources of the DCE.

In one embodiment of the invention, the interface includes a request line and an interface circuit that is electrically connected between the host processor buses and the DCE buses (i.e. the DCE controller's data and address buses). The interface circuit provide a bus bridge that eliminates any disparity between the widths of the host bus and the DCE bus. This enables the host processor to gain direct access to the resources of the controller through the buses without significantly interrupting any DCE controller operation.

In another embodiment, the interface circuit has a set of three to eight registers that form an address through which the host processor directly accesses the DCE peripherals. These registers provide the host processor with the ability to access the controller's peripherals and perform data transfers that are transparent to the controller and DSP cores. That is, the interface circuit enables the host processor to control the type of transfer (I/O or memory), and control the handshaking for multiple consecutive transfers and to check the status of available I/O registers of the DCE thereby managing I/O peripherals of the modem. This enables the controller and the DSP to provide more efficient performance for applications requiring more demand on the modem communication (i.e. DSVD). Thus, the present invention overcomes, to a large extent, the limitations associated with the prior art.

These and other features of the invention are described in more complete detail in the following detailed description of the invention when taken with the drawings. The scope of the invention, however, is limited only by the claims appended hereto.

BRIEF DESCRIPTION OF THE FIGURES

FIG. 3 is a circuit diagram of one embodiment of the computer bus resource port shown in FIG. 2.

DETAILED DESCRIPTION OF THE INVENTION

Figure 1:
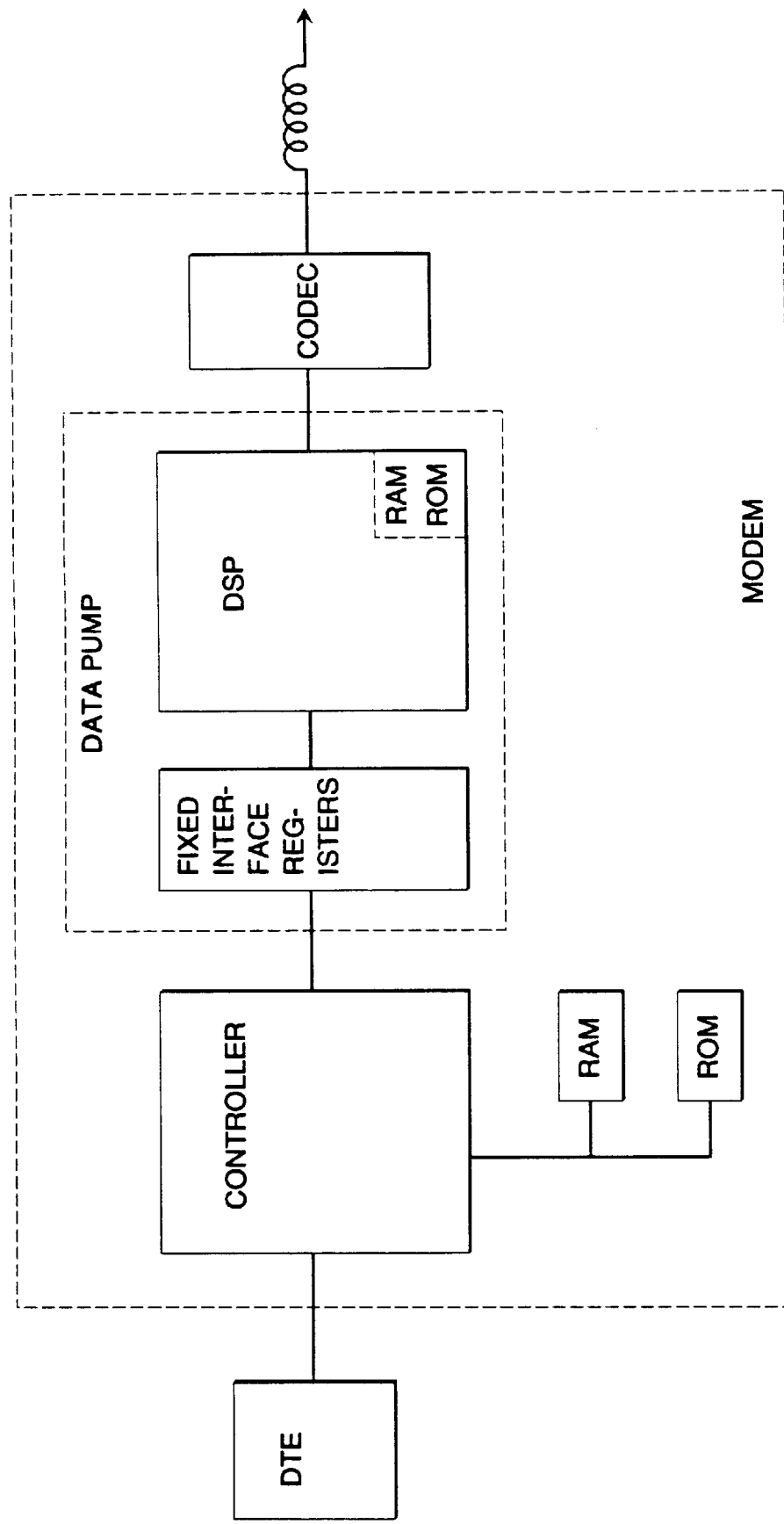
FIG. 1 is a block diagram of a typical modem architecture of the prior art.
Figure 2:
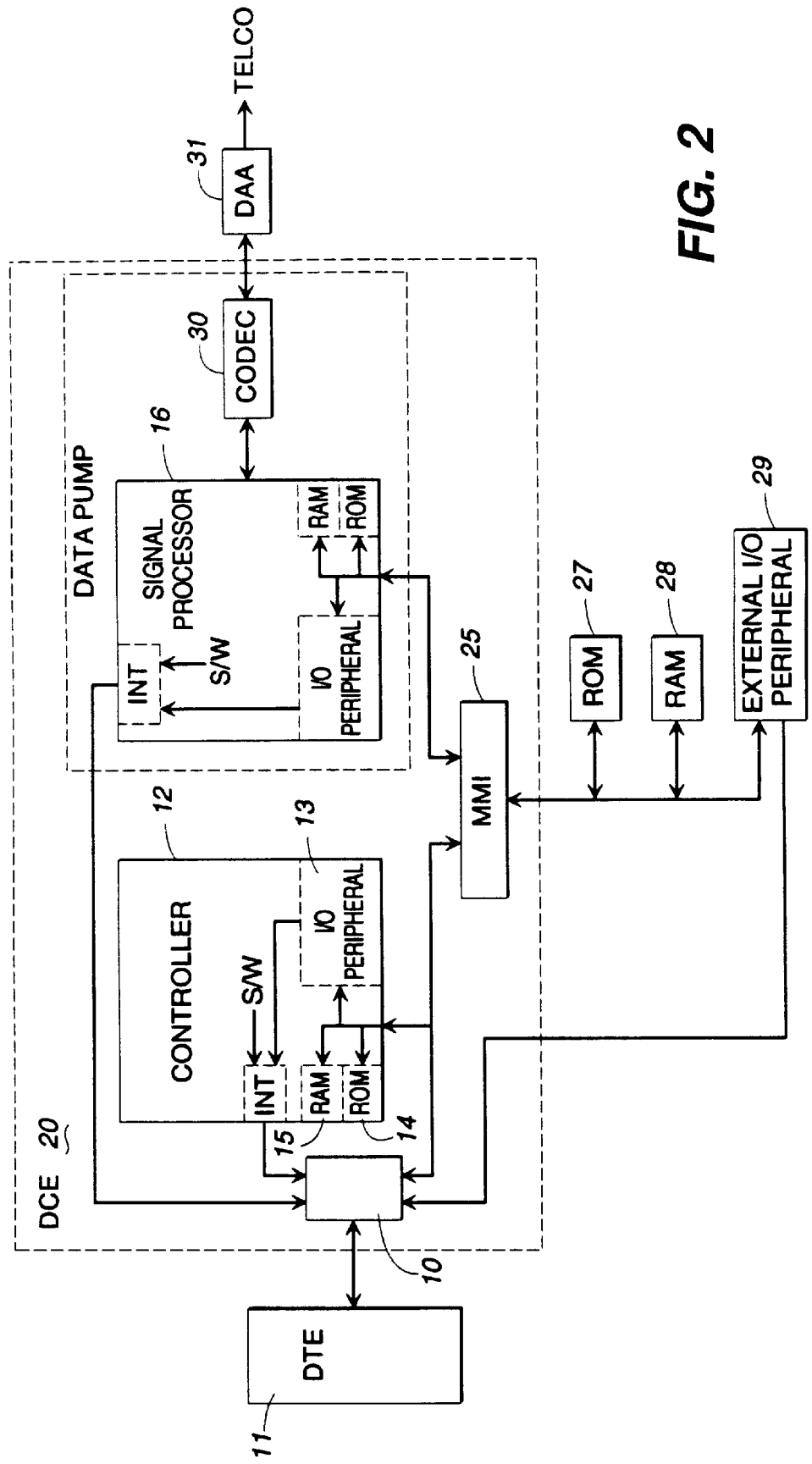
FIG. 2 is a block diagram of a DCE having a computer bus resource port of the present invention.

Referring now to FIG. 2, there is shown a block diagram of a typical present day modem or DCE 20 having a computer bus resource port or resource port 10 according to the present invention. As shown, resource port 10 is electrically connected between a DTE or host 11, a DCE controller 12, a signal processor 16, a mixed memory interface (MMI) 25 and external I/O peripherals 29. Note, that in an alternate embodiment, resource port 10 may also be electrically connected to internal memory resources of the controller 12, including RAM 15 and ROM 14, and internal I/O peripherals 13.

MMI 25 is electrically connected to controller 12, signal processor or DSP 16, external memory resources 27 and 28, and external I/O peripherals 29. The signal processor 16 is electrically connected to a codec 30 which, in turn, is electrically connected to a data access arrangement (DAA) 31.

In operation, resource port 10 provides the facility for host DTE 11 to request, share and directly access DCE resources including peripherals 29, external ROM 27, and external RAM 28. As a result, resource port 10 enables host DTE 11 to directly access the DCE resources with and without interrupting controller 12 or DSP 16. To attain this, resource port 10 provides a controller request line (not shown) and an interface circuit (not shown) that enables host 11 to directly access and index all the available memory resources and I/O peripherals DCE 20.

In general, resource port 10 eliminates any disparity between the widths of the address and data buses of host 11 with respect to the widths of the address and data buses of controller 12. This enables host 11 to gain direct access to peripherals 29, memory resources 27 and 28, and other resources of DCE 20 without significantly interrupting the operation of controller 12. As a result, through resource port 10, the host DTE 11 can share or take control over various functions of the modem controller 12.

Through this feature, the size of the memory of controller 12 and the mega-instruction-per-second load on the processor of host DTE 11 can be optimized for any given set of communications tasks. That is, resource port 10 provides the ability to remove functions, that are complex and/or demand much memory space, from the controller 12 to the processor of the host DTE, where the host processor has more processing power and memory space available for such tasks. This is highly beneficial for providing more efficient and less costly communications through such devices because it enables the host DTE which has more memory resources and processing power to relieve the DCE controller of these more complex and memory demanding tasks.

As a result, the present invention provides a means for significantly reducing the cost of the modem while providing a more flexible and efficient communication between the host equipment and the DCE. Consequently, as host processors and their operating systems become more powerful, the resource port of the present invention enables the shifting of more of these memory-taxing modem functions from the modem to the host, thus reducing modem costs without sacrificing overall performance of the data communications provided thereby.

For example, the resource port of the present invention may facilitate the development of controller-less modems, wherein the host PC provides control over the modem operation. Although such modems face problems with present day applications, they may be improved when various timing problems are resolved between the remote and local data-pump digital links.

The resource port of the present invention, however, provides several other advantages over present day data communications equipment or modems. One advantage is that the resource port provides a means for overcoming host processor system bus latencies. There are many latencies for each access of the host bus when a modem or any other function shares the same host system bus. Many users on this type of system often fight with each other for system bus bandwidth. The overhead associated with such sharing causes latencies that every user on the bus must experience.

The resource port of the present invention, however, allows a host processor to manage cyclic buffers on both the host and DCE memory space for each stream of information between the host and the DCE. This significantly reduces the problems that would be associated with implementing the sharing of the host bus with present day modems, as described above. For example, an interface logic circuit controlled by the host processor via I/O registers can provide data transfers between the DCE and the host system memory without the host processor being involved in every byte transfer. More specifically, the interface logic can manipulate the resource port to access the memory space of the DCE, and thereby transfer data in a cyclic buffer manner between the DCE's memory space and the host's memory space. Without the resource port there would be no way to create dynamic buffers on the DCE side to accommodate such bus latencies. This is very important in real time or Isochronous data types like audio data.

Another advantage of a DCE implementing the resource port of the present invention is that the ROM code size for DCE processors can be significantly reduced. As more features are required on modems (i.e. DSVD), the required DCE controller's ROM code size increases. As described above, by enabling the down-loading of the DCE controller's functions to the host, a DCE having the resource port of the present invention can provide the ability to significantly minimize any demand on the size of the DCE's ROM.

To provide the host DTE with the ability to take control over some peripherals of the DCE and the DCE controller or signal processor, the resource port provides interrupt management. The interrupt management is provided through circuitry that handles multiple input interrupt requests and generates an output interrupt request to the host DTE.

There are several possible sources of such interrupts in a DTE/DCE environment. They include, (1) controller internal I/O peripherals, (2) controller software generated interrupts, (3) DSP internal I/O peripherals, (4) DSP software generated interrupts, and (5) external DCE peripherals including video peripherals during host-based video conferencing. The interrupt management circuitry (not shown) of the resource port of the present invention is such that it can handle each of these sources of interrupts to provide host access to the peripherals, as described.

This ability for the host DTE to gain access to multiple external I/O devices via the resource port of the present invention opens up new opportunities in the modem market. For example, the present invention enables ISDN/MODEM combination products to use the host DTE resources to reduce cost. The ISDN physical layer interface devices can be I/O mapped and the protocol software stack can be running on the DCE controller or the host DTE. Again, the present invention enables both the DCE controller and the host DTE processor to work together to achieve high end features with substantially minimized cost.

It should thus be reemphasized that the resource port of the present invention provides a DCE with the ability to maximize the ratio of performance to cost by minimizing the amount of internal controller memory required during operation thereof. As a result, the resource port of the present invention provides the DCE controller with the ability to store frequently used variables in controller internal RAM, and store small pieces of V.24 bis data compression code in controller internal ROM to increase throughput. As a result, the resource port of the present invention enables the DTE processor and the DCE processor to both actively take part in executing a "task scheduler", wherein the host DTE can assign a new task. This provides the ability for the DTE and DCE to work together to define the best possible processing solution for any application.

It should also be noted that in the embodiment shown in FIG. 2, wherein a modem incorporates a resource port 10 according to the present invention, the MMI 25 acts as a bridge between the memory resources of controller 12 and signal processor 16. As a result, MMI 25 handles data transfers to external memory resources 27 and 28, and resource port 10 is responsible for byte wide transfers between host DTE 11 and the memory resources or I/O resources of controller 12. This enables signal processor 16 to access memory a word (i.e. 16 bits) at a time, while enabling the controller 12 to access the same memory a byte at a time. As a result, controller 12 and host DTE 11 would be unaware that active byte transfers are being shifted by the MMI 25, thus providing efficient use of external DCE shared memory 27 and 28.

A block diagram of one embodiment of resource port 10 is shown in FIG. 3, hereinafter referred to as resource port 50. As shown, resource port 50 has a programmable decoder 51 and a resource port controller 59. Programmable controller is electrically coupled to a memory resource address register 52, a memory resource data register 53, a transfer register 54 for size and type of transfer, a read/write transfer control 55, a DMA and prefetch control 56 and an interrupt or polling transfer manager 57. Address register 52, data register 53, transfer register 54, and transfer control 55 are all electrically coupled to a memory resource bus 61 which is electrically coupled to the signal processor (not shown), controller (not shown) and other components and resource (not shown) of DCE 60.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A data communications system comprising:
 a host processor;
 a data communications client in communications with said host processor, said data communications client including a control means, a memory resource and one or more input/output (I/O) resources, wherein said control means is operable to provide supervision over communications to or from said memory resource and said I/O resource; and
 a resource port in communication with said host processor and said data communications client, said resource port including a bus bridge operative to overcome a disparity in bus width between said host processor and said data communications client and an interrupt manager operable to handle multiple input requests from said data communications client and to generate an output interrupt request to said host processor, and
 said resource port providing a direct communications path between said host processor and one or more of said data communications client resources whereby said host processor is enabled to directly access said data communications resources without involvement of said control means.

2. The system of claim 1 wherein the data communications client I/O resources include I/O registers and I/O peripherals.

3. The system of claim 1 wherein said resource port has a controller request line and an interface circuit for providing said host processor with the facility to directly access the data communications client resources.

4. The system of claim 1 wherein said resource port comprises a resource port controller, a programmable decoder, a memory resource address register, a memory resource data register, a transfer size and type register, a read/write transfer control, a DMA and prefetch control, and an interrupt transfer manager.

5. The system of claim 4 wherein said interrupt transfer manager comprises interrupt circuitry that handles multiple input interrupt requests and generates an output interrupt request to the host processor.

6. The system of claim 5 wherein said interrupt circuitry further provides the facility for said host processor to take control over at least one source of interrupts.

7. A computer bus resource port for interfacing a host data terminal equipment (DTE) with a data communications equipment (DCE), the DCE including a memory resource and one or more input/output (I/O) resources, the computer bus resource port comprising:

a controller request line and an interface circuit for providing the host DTE with the facility to directly access at least some of the DCE resources, the interface circuit including a bus bridge operative to overcome a disparity in bus width between the DTE and the DCE, whereby data transfer is achieved in a cyclic buffer manner between the DCE's memory resource and a memory space in the DTE without involvement of said DTE on each data transfer and transparent to any DCE controller that may be present.

8. The computer bus resource port of claim 7 wherein the DTE has a DTE address bus and a DTE data bus, and wherein the DCE has a DCE controller, a DCE address bus and a DCE data bus.

9. The computer bus resource port of claim 4 wherein said bus bridge enables the DTE to achieve direct access to said resources of the DCE without interrupting said DCE controller.

10. The DCE of claim 1 wherein said resource port further provides the facility for removing processing functions from said DCE controller to said DTE processor to relieve said DCE controller of complex and memory demanding tasks.

11. The DCE of claim 7 wherein said resource port comprises a resource port controller, a programmable decoder, a memory resource address register, a memory resource data register, a transfer size and type register, a read/write transfer control, a DMA and prefetch control, and an interrupt transfer manager.

12. The DCE of claim 11 wherein said interrupt transfer manager comprises interrupt circuitry that handles multiple input interrupt requests and generates an output interrupt request to the host DTE.

13. The DCE of claim 12 wherein said interrupt circuitry further provides the facility for said host DTE to take control over at least some sources of interrupts.

14. A computer bus resource port for providing an interface between a data terminal equipment host and a data communications equipment, the host having a processor, a data bus and an address bus, the data communications equipment having a data bus and an address bus electrically coupled to a plurality of resources, the computer bus resource port comprising:

an interface circuit electrically connecting the host address bus and host data bus to the data communications equipment address bus and data bus, said interface circuit including a bus bridge operative to overcome a disparity between bus width for said host data and address busses and said data communications equipment data and address busses, and an interrupt manager operable to handle multiple input requests from said data communications client and to generate an output interrupt request to said host processor provide the host processor said resource port being thereby enabled to provide a direct communications path between said data terminal equipment host processor and one or more of said data communications equipment resources.

15. The resource port of claim 14 wherein the resources of the data communications equipment include I/O peripherals and memory space.

* * * * *